(12) United States Patent
Tolentino et al.

(10) Patent No.: US 11,752,977 B2
(45) Date of Patent: Sep. 12, 2023

(54) WINDSHIELD WIPER CONNECTOR

(71) Applicant: Pylon Manufacturing Corp, Deerfield Beach, FL (US)

(72) Inventors: Vambi Raymundo Tolentino, Cocounut Creek, FL (US); Robert Peter Peers, Boca Raton, FL (US); Hiroshi Kawashima, Sunrise, FL (US)

(73) Assignee: PYLON MANUFACTURING CORPORATION, Deerfield Beach, FL (US)

( * ) Notice: Subject to any disclaimer, the term of this patent is extended or adjusted under 35 U.S.C. 154(b) by 0 days.

(21) Appl. No.: 17/671,475

(22) Filed: Feb. 14, 2022

(65) Prior Publication Data

US 2022/0169209 A1   Jun. 2, 2022

Related U.S. Application Data

(63) Continuation of application No. 16/444,754, filed on Jun. 18, 2019, now Pat. No. 11,247,641, which is a continuation of application No. 15/815,068, filed on Nov. 16, 2017, now Pat. No. 10,322,699, which is a continuation-in-part of application No. 14/827,928, filed on Aug. 17, 2015, now Pat. No. 10,597,004, which is a continuation of application No. 14/329,423, filed on Jul. 11, 2014, now Pat. No. 9,108,595, which is a continuation-in-part of application No. 13/194,070, filed on Jul. 29, 2011, now Pat. No. 8,806,700.

(51) Int. Cl.
*B60S 1/38* (2006.01)
*B60S 1/40* (2006.01)

(52) U.S. Cl.
CPC ............. *B60S 1/387* (2013.01); *B60S 1/3849* (2013.01); *B60S 1/4048* (2013.01); *B60S 2001/4054* (2013.01); *B60S 2001/4058* (2013.01)

(58) Field of Classification Search
CPC ..... B60S 1/3849; B60S 1/3851; B60S 1/3853
See application file for complete search history.

(56) References Cited

FOREIGN PATENT DOCUMENTS

EP           2080680 A1 *   7/2009   ............ B60S 1/3849

OTHER PUBLICATIONS

EP2080680A1 (Year: 2009).*

* cited by examiner

*Primary Examiner* — Andrew A Horton
(74) *Attorney, Agent, or Firm* — BAKERHOSTETLER; John M. Mueller

(57) ABSTRACT

A wiper blade connector including a body member having a first side wall, a second wall, and a top surface extending between the first and second side walls and a connector securing structure, which may include a rivet passage and an arcuate rivet clip, the arcuate rivet clip extending substantially perpendicular to the rivet passage, and a wiper blade incorporating same.

9 Claims, 17 Drawing Sheets

WINDSHIELD WIPER CONNECTOR

CROSS REFERENCE TO RELATED APPLICATIONS

This application is a continuation of U.S. application Ser. No. 16/444,754 filed Jun. 18, 2019, which is a continuation of U.S. application Ser. No. 15/815,068 filed on Nov. 16, 2017, which is a Continuation-in-Part of application Ser. No. 14/827,928 filed Aug. 17, 2015, which is a Continuation of application Ser. No. 14/329,423 filed Jul. 11, 2014, which is a Continuation-in-Part of application Ser. No. 13/194,070 filed Jul. 29, 2011, the entire contents of which are herein incorporated by reference.

FIELD OF THE DISCLOSURE

This disclosure generally relates to windshield wiper blades, and more particularly, to a wiper blade connector that allows the windshield wiper blade to be coupled with multiple types of windshield wiper arm configurations.

BACKGROUND

There are a variety of wiper arms on which wiper blades are provided as original equipment. These various wiper arms have hooks, pins, or other configurations which may connect to the wiper blade with or without connectors. These various configurations have created a problem in the replacement market because wiper blade providers are required to have multiple wiper blade configurations to accommodate all of the existing wiper arms. It is therefore advantageous to have attachment structures that can accommodate a host of arms to reduce the complexity and cost associated with plurality of wiper blade arm configuration.

Two commonly used wiper arms in the art include the single tongue wiper arm disclosed in U.S. Pat. No. 7,891,044, the entire contents of which is incorporated herein by reference, and the double tongue wiper arm disclosed in U.S. Pat. No. 7,716,780, the entire contents of which are incorporated herein by reference. To fit both the '044 wiper arm and the '780 wiper arm requires a particularly sized and structured wiper blade connector to be compatible with the single tongue wiper arm and the double tongue wiper arm, respectively. To install an original equipment replacement blade onto a single tongue wiper arm, the wiper blade (with affixed wiper blade connector) must be joined with the wiper arm at an awkward angle such that the wiper arm's tongue engages the tongue receiver located on the wiper blade connector. The wiper blade and connector pairing is then rotated to bring it into a position parallel to the wiper blade arm, thereby locking the wiper blade assembly into place. A similarly arduous process is required for installation of an original equipment replacement wiper blade with a double tongue wiper arm. The front tongue engages the tongue receiver, similar to the single tongue connection process, after which the wiper blade and connector pairing must be rotated towards the wiper arm while ensuring that the rear tongue does not interfere with the cover of the second tongue receiver. After the rear tongue has cleared the cover, the wiper blade and connector pair must be pulled backwards for locked attachment with the wiper arm.

BRIEF SUMMARY OF THE DISCLOSURE

The following presents a simplified summary of the disclosure in order to provide a basic understanding of some aspects of the invention. This summary is not an extensive overview of the invention. Rather than specifically identify key or critical elements of the invention or to delineate the scope of the invention, its purpose, inter alia, is to present some concepts of the invention in accordance with the disclosure in a simplified form as a prelude to the more detailed description that is presented later.

In certain embodiments, a connector for connecting a wiper blade is provided in accordance with the disclosure. The connector may include a body member having a a first side wall, a second wall, and a top surface extending between the first and second side walls. The connector may further include a connector securing structure, which may include a rivet passage and an arcuate rivet clip, the arcuate rivet clip extending substantially perpendicular to the rivet passage.

In certain embodiments, a wiper blade assembly is further provided in accordance with the disclosure. The wiper blade assembly may include: a wiper blade comprising a wiper strip and a mounting base; and a connector for connecting a wiper blade to a wiper arm. The connector may include a body member having a first side wall, a second wall, and a top surface extending between the first and second side walls. The connector may further include a connector securing structure, which may include a rivet passage and an arcuate rivet clip, the arcuate rivet clip extending substantially perpendicular to the rivet passage.

In certain embodiments, a connector for coupling a wiper blade with a wiper arm is provided in accordance with the disclosure. The connector may include: an elongate body member having a front end, a rear end, a first side wall, a second wall, and a top surface extending between the first and second side walls; a connector securing structure. The connector securing structure may include a rivet passage and an arcuate rivet clip, the arcuate rivet clip extending substantially perpendicular extending to the rivet passage. The connector may further include a first side channel longitudinally extending along a portion of an outer surface of the first side wall proximate the first end of the elongate body member. The connector may further include a first tongue receiving opening located towards the front end of the elongate body member, where the first tongue opening may be structured to receive a corresponding front tongue on the wiper arm. The cap may be a U-shaped cap having an upper wall and first and second side walls, and including a first side protrusion provided on an interior surface of the first side wall of the cap. The first side protrusion of the cap may be correspondingly dimensioned and positioned to slide along the first side channel as the cap is slid between an open position and a closed position, the cap operable to secure the received corresponding front tongue on the wiper arm. The first side channel may be oriented in a direction corresponding with the longitudinal direction of the elongate body member, the cap thereby slidable substantially parallel to the top surface.

BRIEF DESCRIPTION OF THE FIGURES

The following description and the annexed drawings set forth certain illustrative aspects of the invention. These aspects are indicative of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION

Figure 1:
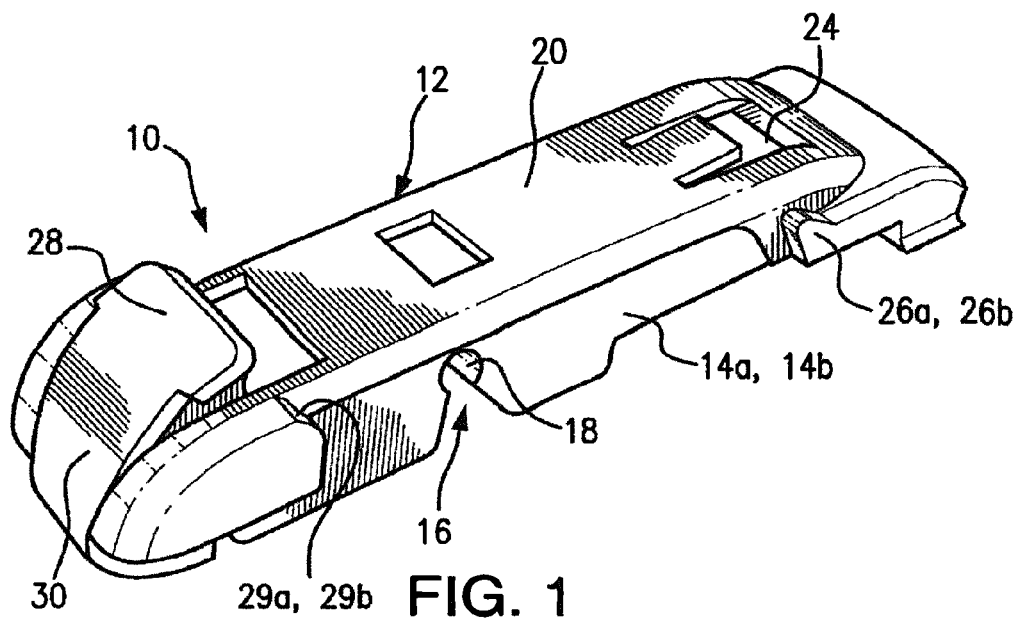
FIG. 1 is a perspective view of an embodiment of a wiper blade connector of the present disclosure.

Throughout the disclosure, the terms "a" or "an" may refer to one or more than one. In this document, the term "or" is used to refer to a nonexclusive or, unless otherwise indicated. Furthermore, references to "one embodiment" are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

The following detailed description and the appended drawings describe and illustrate exemplary embodiments of the disclosure solely for the purpose of enabling one of ordinary skill in the relevant art to make and use the invention. As such, the detailed description and illustration of these embodiments are purely exemplary in nature and are in no way intended to limit the scope of the invention, or its protection, in any manner. It should also be understood that the drawings may not be to scale and in certain instances details may have been omitted, which are not necessary for an understanding of the present invention, such as conventional details of fabrication and assembly. These embodiments, which are also referred to herein as "examples," are described in sufficient detail to enable those skilled in the art to practice the subject matter disclosed herein. It is to be understood that the embodiments may be combined or that other embodiments may be utilized, and that structural, logical, and electrical variations may be made without departing from the scope of the subject matter disclosed herein. The following detailed description is, therefore, not to be taken in a limiting sense, and the scope of the subject matter disclosed herein is defined by the appended claims and their equivalents.

One embodiment of a wiper blade connector for connecting a wiper blade to a wiper arm may include the following components: an elongate body member having a front end, a rear end, a first side wall, a second side wall, and a top surface extending between the first and second side walls; an arcuate rivet clip extending between said first side wall and said second side wall, said arcuate rivet clip being structured and disposed for releasably securing the wiper blade to said connector, and said arcuate rivet clip being sized to allow said releasably secured wiper blade to pivot during operation of said wiper blade; a rivet passage extending between said first side wall and said second side wall, said rivet passage being structured and disposed for providing exposed access to said arcuate rivet clip; a first tongue receiving opening located towards the front end of said elongate body member, said first tongue receiving opening being structured and disposed for receiving a corresponding front tongue on the wiper arm, the wiper arm thereby contacting the top surface as the front tongue of the wiper arm is received in the first tongue receiving opening; a locking mechanism capable of releasably locking said connector to said wiper arm, the locking mechanism comprising a door member rotatable about an axis, wherein the axis is located within the door member such that all sides of the axis are surrounded by at least a portion of the door member, the door member operable to rotate between an open unlocked position and a closed locked position, the entire portion of the door member surrounding the axis is rotatable about the axis, said open unlocked position serving to provide access to said first tongue receiving opening, and said closed locked position serving to releasably lock said corresponding front tongue within said first tongue receiving opening; and a second tongue receiving opening located towards the rear end of said elongate body member, said second receiving opening being structured and disposed for receiving a corresponding rear tongue on the wiper arm.

In some embodiments of the connector, the partially rotatable door member may further include a flared hood sized for grasping by a user, thereby allowing the user to pivot the partially rotatable door member between said open unlocked position and said closed locked position. The rear end of the elongate body may include a shoulder extending along each of the first and second side walls, the should being structured and disposed for releasably engaging corresponding wing members on the wiper arm. The front end of the elongate body may further include a ramp extending along each of the first and second side walls, the ramp being structured and disposed for guiding the first tongue of the wiper arm into the first tongue receiving opening. The arcuate rivet clip may have a diameter larger than the rivet passage, thereby allowing for snapped attachment of the wiper blade to the connector. The top surface may longitudinally extend along the majority of the length of the elongate body member between the front and rear ends. The locking mechanism may further include a pair of locking walls, the rotatable door received between the pair of locking walls and the axis extending between the locking walls.

In another embodiment of a connector for connecting a wiper blade to a wiper arm, the connector may include the following components: an elongate body member having a front end, a rear end, a first side wall, a second side wall, and a top surface extending between the first and second side walls; a connector securing structure comprising an arcuate rivet clip; a rivet passage extending between said first side wall and said second side wall, said rivet passage being structured and disposed for providing exposed access to said arcuate rivet clip, and said rivet passage being sized smaller than the diameter of said arcuate rivet clip, thereby allowing for snapped attachment of said wiper blade to said connector; a first tongue receiving opening located on the front end of said elongate body member, said first tongue receiving opening being structured and disposed for receiving a corresponding front tongue on the wiper arm; a second tongue receiving opening located towards the rear end of said elongate body member, said second tongue receiving opening structured as an opening in the top surface, a corresponding rear tongue on the wiper arm insertable through the second tongue receiving opening thereby positioning at least a portion of the rear tongue below the top surface, the wiper arm thereby contacting the top surface as the front tongue of the wiper arm is received in the first tongue receiving opening and the second tongue of the wiper arm is received in the second tongue receiving opening; a locking mechanism capable of releasably locking said connector to said wiper arm, the locking mechanism comprising a door member rotatable about an axis, wherein the axis is located within the door member such that all sides of the axis are surrounded by at least a portion of the door member, the entire portion of the door member surrounding the axis is rotatable about the axis, the door member operable to rotate between an open unlocked position and a closed locked position; and a tab protruding into the second tongue receiving opening in order to facilitate securing the corresponding rear tongue of the wiper arm when received in the second tongue receiving opening.

In some embodiments of the connector, the door member may further include a flared hood sized for grasping by a user, thereby allowing the user to pivot the partially rotatable door member between said open unlocked position and said closed locked position. The front end of the elongate body may further include a ramp extending along each of the first and second side walls, the ramp being structured and disposed for guiding the first tongue of the wiper arm into the first tongue receiving opening. The top surface may longitudinally extend along the majority of the length of the elongate body member between the front and rear ends. The locking mechanism may further include a pair of locking walls, the rotatable door received between the pair of locking walls and the axis extending between the locking walls.

An embodiment of a wiper assembly may include a wiper blade having a mounting base, and a connector for connecting the wiper blade to a wiper arm. The connector may include: an elongate body member having a front end, a rear end, a first side wall, a second side wall, and a top surface extending between the first and second side walls; an arcuate rivet clip extending between said first side wall and said second side wall, said arcuate rivet clip being structured and disposed for releasably securing the wiper blade to said connector, and said arcuate rivet clip being sized to allow said releasably secured wiper blade to pivot during operation of said wiper blade; a rivet passage extending between said first side wall and said second side wall, said rivet passage being structured and disposed for providing exposed access to said arcuate rivet clip; a first tongue receiving opening located towards the front end of said elongate body member, said first tongue receiving opening being structured and disposed for receiving a corresponding front tongue on the wiper arm, the wiper arm thereby contacting the top surface as the front tongue of the wiper arm is received in the first tongue receiving opening; a locking mechanism capable of releasably locking said connector to said wiper arm, the locking mechanism comprising a door member rotatable about an axis, wherein the axis is located within the door member such that all sides of the axis are surrounded by at least a portion of the door member, the door member operable to rotate between an open unlocked position and a closed locked position, the entire portion of the door member surrounding the axis is rotatable about the axis, said open unlocked position serving to provide access to said first tongue receiving opening, and said closed locked position serving to releasably lock said corresponding front tongue within said first tongue receiving opening; and a second tongue receiving opening located towards the rear end of said elongate body member, said second receiving opening being structured and disposed for receiving a corresponding rear tongue on the wiper arm.

In another embodiment of a connector for connecting a wiper blade to a wiper arm, the connector may include: an elongate body member having a front end, a rear end, a first side wall, a second wall, and a top surface extending between the first and second side walls; a connector securing structure; a first tongue receiving opening located towards the front end of the elongate body member, the first tongue opening structured to receive a corresponding front tongue on the wiper arm; and a cap provided proximate to the front end of the connector, the cap slidable between an open position and a closed position, the cap operable to secure the received corresponding front tongue on the wiper arm. The connector may further include a side channel longitudinally extending along a portion of the first side wall proximate the first end of the elongate body member; and a side indent provided on an interior side surface of the cap, the side indent correspondingly dimensioned and positioned to slide along the first side wall as the cap is slid between the open and closed positions. The connector may further include a second side channel longitudinally extending along a portion of the second side wall proximate the first end of the elongate body member; and an additional side indent provided on an opposed interior side surface of the cap, the additional side indent correspondingly dimensioned and positioned to slide along the second side wall as the cap is slid between the open and closed positions. The connector may further include a front locking tab provided within the first tongue opening, the front locking tab including a top portion and an arm portion connecting the top portion with the elongate body member; a locking tab channel provided on an under side surface of the cap, the locking tab channel conformingly dimensioned to permit the top portion of the front locking tab to slide along the locking tab channel as the cap is slid between the open and closed position. The connector may further include a locking tab cavity provided on the cap adjacent to locking tab channel, the cavity conformingly dimensioned with the top portion of the locking tab and positioned to receive the top portion of the locking tab when the cap is in the closed position. In some embodiments a resilient portion of the cap projects into the locking tab channel in order to increase the longitudinal force required to slide the top portion of the locking tab into and out of the cavity. The connector may further include an upper tab projecting from an underside surface of the cap, the upper tab contacting the upper surface of the elongate body member. In some embodiments the distance which the upper tab projects from the underside surface is a clearance distance between cap and the upper surface of the elongate body member, the clearance distance sufficient to permit the cap to slide over a distal portion of the received front tongue as the cap is slid into the closed position. In some embodiments the connector securing structure includes a rivet passage and an arcuate rivet clip, wherein the arcuate rivet clip extends between the first and second side walls and is structured and disposed for releasably securing the wiper blade to the connector, and the arcuate rivet clip sized to permit the releasably secured wiper blade to pivot during operation of the wiper blade; and the rivet passage extending between the first and second side walls, the rivet passage structured and disposed to permit access to the arcuate rivet clip.

In another embodiment of the disclosure, a connector for connecting a wiper blade to a wiper arm may include: an elongate body member having a front end, a rear end, a first side wall, a second wall, and a top surface extending between the first and second side walls; a connector securing structure; a first tongue receiving opening located towards the front end of the elongate body member, the first tongue opening structured to receive a corresponding front tongue on the wiper arm; a second tongue receiving opening located towards the rear end of the elongate body member, the second tongue opening structured to receive a corresponding rear tongue on the wiper arm; and a cap provided proximate to the front end of the connector, the cap slidable between an open position and a closed position, the cap operable to secure the received corresponding front tongue on the wiper arm. The connector may further include a rear tab projecting into the rear tongue opening, at least a distal portion of the rear tongue fittable underneath the rear tab when received in the second tongue opening. The connector may further include: a side channel longitudinally extending along a portion of the first side wall proximate the first end of the elongate body member; a side indent provided on an interior side surface of the cap, the side indent correspondingly dimensioned and positioned to slide along the first side wall as the cap is slid between the open and closed positions; a second side channel longitudinally extending along a portion of the second side wall proximate the first end of the elongate body member; an additional side indent provided on an opposed interior side surface of the cap, the additional side indent correspondingly dimensioned and positioned to slide along the second side wall as the cap is slid between the open and closed positions; a front locking tab provided within the first tongue opening, the front locking tab including a top portion and an arm portion connecting the top portion with the elongate body member; a locking tab channel provided on an under side surface of the cap, the locking channel conformingly dimensioned to permit the top portion of the front locking tab to slide along the locking tab channel as the cap is slid between the open and closed position; a locking tab cavity provided on the cap adjacent to the locking tab channel, the cavity conformingly dimensioned with the top portion of the locking tab and positioned to receive the top portion of the locking tab when the cap is in the closed position, a resilient portion of the cap projecting into the locking tab channel in order to increase the longitudinal force required to slide the top portion of the locking tab into and out of the cavity; and an upper tab projecting a clearance distance from the underside surface of the cap, the upper tab contacting the upper surface of the elongate body member, the clearance distance sufficient to permit the cap to slide over a distal portion of the received front tongue as the cap is slid into the closed position.

An embodiment of a wiper blade assembly is further provided in accordance with the disclosure, where the wiper blade assembly may include: a wiper blade comprising a wiper strip and a mounting base; and a connector for connecting a wiper blade to a wiper arm, the connector comprising: an elongate body member having a front end, a rear end, a first side wall, a second wall, and a top surface extending between the first and second side walls; a connector securing structure; a first tongue receiving opening located towards the front end of the elongate body member, the first tongue opening structured to receive a corresponding front tongue on the wiper arm; and a cap provided proximate to the front end of the connector, the cap slidable between an open position and a closed position, the cap operable to secure the received corresponding front tongue on the wiper arm. The connector of the wiper blade assembly may further include a side channel longitudinally extending along a portion of the first side wall proximate the first end of the elongate body member; and a side indent provided on an interior side surface of the cap, the side indent correspondingly dimensioned and positioned to slide along the first side wall as the cap is slid between the open and closed positions. The wiper blade assembly may further include a second side channel longitudinally extending along a portion of the second side wall proximate the first end of the elongate body member; and an additional side indent provided on an opposed interior side surface of the cap, the additional side indent correspondingly dimensioned and positioned to slide along the second side wall as the cap is slid between the open and closed positions. The connector of the wiper blade assembly may further include a front locking tab provided within the first tongue opening, the front locking tab including a top portion and an arm portion connecting the top portion with the elongate body member; a locking tab channel provided on an under side surface of the cap, the locking tab channel conformingly dimensioned to permit the top portion of the front locking tab to slide along the locking tab channel as the cap is slid between the open and closed position. The connector may further include a locking tab cavity provided on the cap adjacent to locking tab channel, the cavity conformingly dimensioned with the top portion of the locking tab and positioned to receive the top portion of the locking tab when the cap is in the closed position. In some embodiments, a resilient portion of the cap projects into the locking tab channel in order to increase the longitudinal force required to slide the top portion of the locking tab into and out of the cavity. The connector may further include an upper tab projecting from an underside surface of the cap, the upper tab contacting the upper surface of the elongate body member. In some embodiments, the which the upper tab projects from the underside surface is a clearance distance between cap and the upper surface of the elongate body member, the clearance distance sufficient to permit the cap to slide over a distal portion of the received front tongue as the cap is slid into the closed position.

In certain embodiments, a connector for connecting a wiper blade is provided in accordance with the disclosure. The connector may include a body member having a first side wall, a second wall, and a top surface extending between the first and second side walls. The connector may further include a connector securing structure, which may include a rivet passage and an arcuate rivet clip, the arcuate rivet clip extending substantially perpendicular to the rivet passage.

In certain embodiments, the connector securing structure is embodied on the first side wall. In certain such embodiments, the connector securing structure is embodied on the second side wall. In certain embodiments, the arcuate rivet clip is capable of securing a rivet of a wiper blade. In certain embodiments, the arcuate rivet clip is capable of securing a projections of a wiper blade.

In certain embodiments, a wiper blade assembly is further provided in accordance with the disclosure. The wiper blade assembly may include: a wiper blade comprising a wiper strip and a mounting base; and a connector for connecting a wiper blade to a wiper arm. The connector may include a body member having a first side wall, a second wall, and a top surface extending between the first and second side walls. The connector may further include a connector securing structure, which may include a rivet passage and an arcuate rivet clip, the arcuate rivet clip extending substantially perpendicular to the rivet passage.

In certain embodiments, the connector securing structure is embodied on the first side wall. In certain such embodiments, the connector securing structure is embodied on the second side wall. In certain embodiments, the mounting base further comprises a rivet and the arcuate rivet clip is capable of securing the rivet. In certain embodiments, the mounting base further comprises at least one projection, and the arcuate rivet clip is capable of securing the at least one projection.

In certain embodiments, a connector for coupling a wiper blade with a wiper arm is provided in accordance with the disclosure. The connector may include: an elongate body member having a front end, a rear end, a first side wall, a second wall, and a top surface extending between the first and second side walls; a connector securing structure. The connector securing structure may include a rivet passage and an arcuate rivet clip, the arcuate rivet clip extending substantially perpendicular extending to the rivet passage. The connector may further include a first side channel longitudinally extending along a portion of an outer surface of the first side wall proximate the first end of the elongate body member. The connector may further include a first tongue receiving opening located towards the front end of the elongate body member, where the first tongue opening may be structured to receive a corresponding front tongue on the wiper arm. The cap may be a U-shaped cap having an upper wall and first and second side walls, and including a first side protrusion provided on an interior surface of the first side wall of the cap. The first side protrusion of the cap may be correspondingly dimensioned and positioned to slide along the first side channel as the cap is slid between an open position and a closed position, the cap operable to secure the received corresponding front tongue on the wiper arm. The first side channel may be oriented in a direction corresponding with the longitudinal direction of the elongate body member, the cap thereby slidable substantially parallel to the top surface.

In certain embodiments, a second side channel longitudinally extending along a portion of an outer surface of the second side wall proximate the first end of the elongate body member; and an additional side protrusion provided on an opposed interior side surface of the cap, the additional side protrusion correspondingly dimensioned and positioned to slide along the second side channel as the cap is slid between the open and closed positions. In certain embodiments a front locking tab provided within the first tongue opening, the front locking tab including a top portion and an arm portion connecting the top portion with the elongate body member; and a locking tab channel provided on an under side surface of the cap, the locking tab channel conformingly dimensioned to permit the top portion of the front locking tab to slide along the locking tab channel as the cap is slid between the open and closed position. In certain embodiments a locking tab cavity provided on the cap adjacent to locking tab channel, the cavity conformingly dimensioned with the top portion of the locking tab and positioned to receive the top portion of the locking tab when the cap is in the closed position.

In certain embodiments a resilient portion of the cap projects into the locking tab channel in order to increase the longitudinal force required to slide the top portion of the locking tab into and out of the cavity. In certain embodiments an upper protrusion projecting from an underside surface of the cap, the upper tab contacting the upper surface of the elongate body member. In certain embodiments the distance which the upper protrusion projects from the underside surface is a clearance distance between cap and the upper surface of the elongate body member, the clearance distance sufficient to permit the cap to slide over a distal portion of the received front tongue as the cap is slid into the closed position. In certain embodiments the arcuate rivet clip extends between the first and second side walls and is structured and disposed for releasably securing the wiper blade to the connector, and the arcuate rivet clip sized to permit the releasably secured wiper blade to pivot during operation of the wiper blade; and the rivet passage extending between the first and second side walls, the rivet passage structured and disposed to permit access to the arcuate rivet clip.

In certain embodiments, the wiper blade assembly may include a body member further having a front end, and a rear end. The connector may further include a first side channel longitudinally extending along a portion of an outer surface of the first side wall proximate the front end of the body member. The connector may further include a first tongue receiving opening located towards the front end of the body member, the first tongue opening structured to receive a corresponding front tongue on the wiper arm. The connector may further include a U-shaped cap having an upper wall and first and second side walls, and including a first side protrusion provided on an interior surface of the first side wall of the cap, the first side protrusion correspondingly dimensioned and positioned to slide along the first side channel as the cap is slid between an open position and a closed position, the cap operable to secure the received corresponding front tongue on the wiper arm. The connector may further include wherein the first side channel is oriented in a direction corresponding with the longitudinal direction of the body member, the cap thereby slidable substantially parallel to the top surface.

In reference to FIGS. 1-5, an embodiment of a wiper blade connector may serve to releasably secure a wiper blade 50 to multiple types of wiper arms, including both single tongue wiper arms 60 and double tongue wiper arms 70. Wiper blade connector 10 may include an elongate body member 12 having opposite facing side walls (14a, 14b), which may be connectable to a mounting base 40 of a wiper blade 50. The connector 10 may be connected to the mounting base 40 through a connector securing structure. In one embodiment, as illustrated in FIG. 1, connector 10 may be provided with a connector securing structure that includes a rivet passage 16 and an arcuate rivet clip 18, wherein the rivet passage 16 may extend between side walls (14a, 14b), which may be open at the bottom and provides access to the arcuate rivet clip 18. The rivet passage 16 may be sized slightly less than the diameter of the arcuate rivet clip 18, thereby allowing for snap-fit, captured receipt of a rivet 42 located on the mounting base 40 of a wiper blade 50. The arcuate rivet clip 18 may be sized to allow pivotal movement of the wiper blade 50 and its mounting base 40 relative to the connector 10 and wiper arm (60, 70). Other known or to be developed connector securing structures for connecting connector 10 with mounting base 40 are contemplated within the disclosure, including pegs, protrusions and/or recesses, swapping the rivet to the connector and having the receiving clip on the mounting base, form fit connections, detented connections, and any other methods which allow pivotal movement of the wiper blade 50 and its mounting base 40 relative to the connector 10 and wiper arm (60, 70

Figure 2:
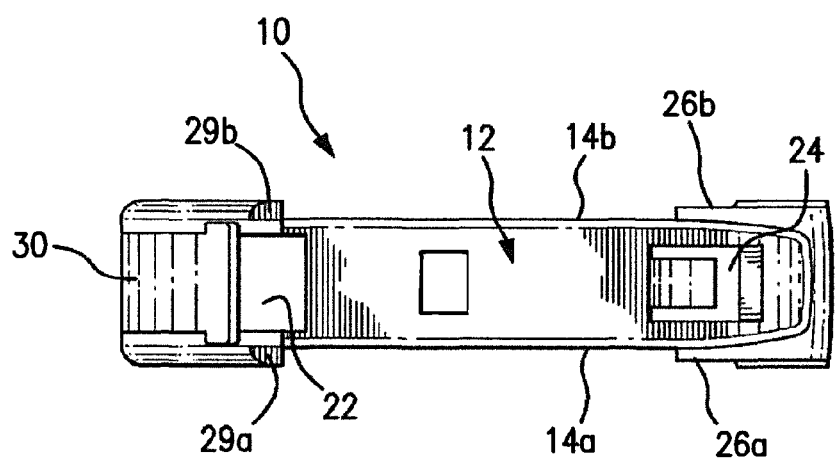
FIG. 2 is a top plan view of the wiper blade connector of FIG. 1.
Figure 3:
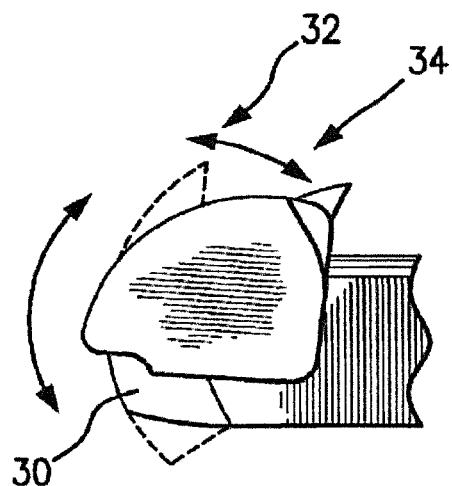
FIG. 3 is a sectional side view of a first end of the wiper blade connector of FIG. 1, and illustrating the range of motion of the partially rotatable door member.
Figure 3A:
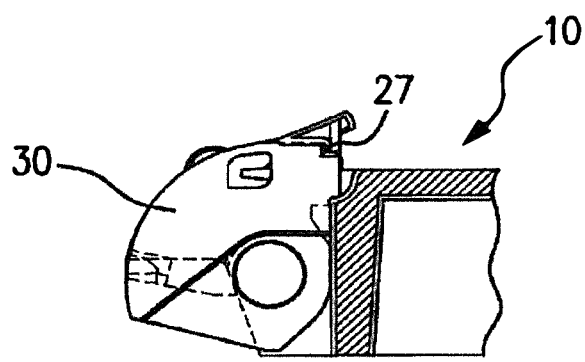
FIG. 3A is a side view of the first end of the wiper blade connector of FIG. 1, shown in cross section, illustrating the partially rotatable door member.
Figure 3B:
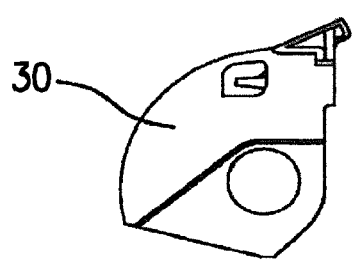
FIG. 3B is a side view of the partially rotatable door member.

FIG. 2 illustrates the top surface 20 of the elongate body member 12, which includes a first tongue receiving opening 22 for receiving a front tongue (62, 72) of a wiper arm (60, 70), located at the front end of the wiper blade connector 10, and a second tongue receiving opening 24 for receiving a rear tongue 74 of a double tongue wiper arm 70, which is located at the rear end. Ramps (29a, 29b) located on opposite sides of the front end of the wiper blade connector 10 are provided for guided receipt of a front tongue (62, 72) into the first tongue receiving opening 22. The front end of the wiper blade connector 10 may further include a retractable locking mechanism, such as a partially rotatable door member 30, which may be rotated between an open position 32 and a closed position 34, as illustrated in FIG. 3. FIGS. 3A and 3B provide isolated illustrations of the partially rotatable door member 30, both in conjunction with the front end of the wiper blade connector 10 and separate from the wiper blade connector 10, respectively, which may be rotatable about an axis 27. Detents can optionally be included to help secure the closed position 34 of the partially rotatable door member 30 by engaging the flared hood 28 when the partially rotatable door member 30 moves from the open position 32 into the closed position 34. Other locking mechanisms known in the art, including without limitation, a hinged lock, a cantilevered lock, and a spring lock may also be used in place of a the rotatable door member 30.

Figure 4:
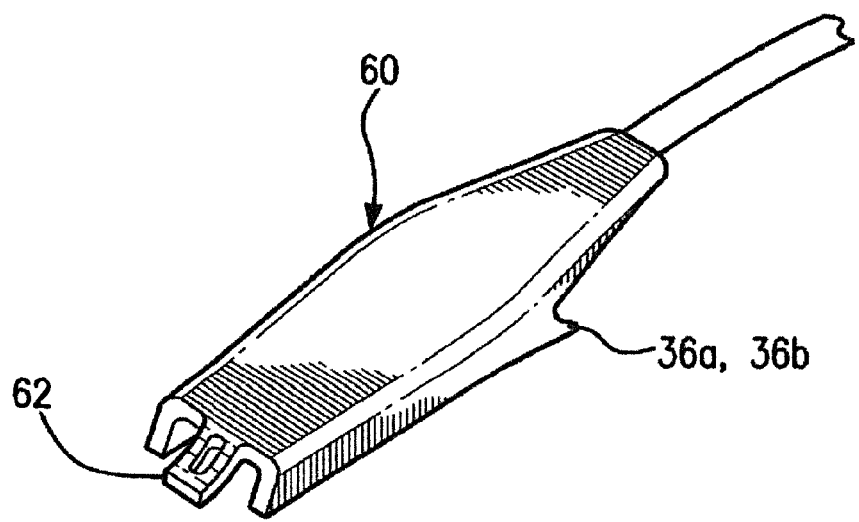
FIG. 4 is a perspective view of a single tongue wiper arm.

Shoulder members (26a, 26b) protruding outwardly from corresponding side walls (14a, 14b) are included at the rear end of the wiper blade connector 10. The shoulder members (26a, 26b) are sized and shaped to releasably engage corresponding rear wing members (36a, 36b), which are located on opposite sides of a single tongue wiper arm 60, as shown in FIG. 4. As further illustrated in FIG. 4, some wiper arms may taper towards the back end that is away from the first tongue (62, 72). Accordingly, in some embodiments of the invention, it is advantageous to taper the side walls (14a, 14b) of the connector 10 to accommodate the tapering shape of certain wiper arms.

Figure 6:
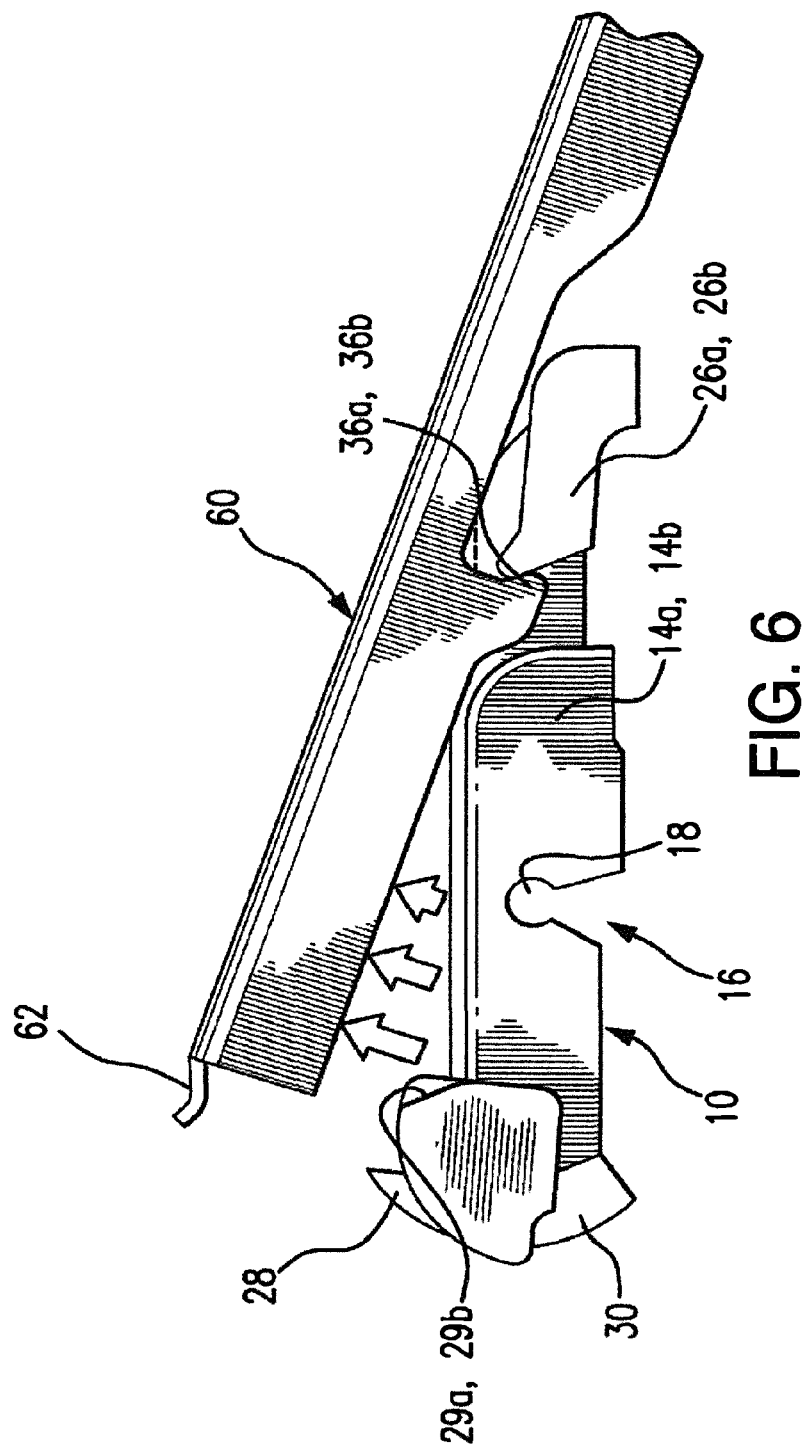
FIG. 6 is a side view of the wiper blade connector of FIG. 1 illustrating the rotational movement of a single tongue wiper arm for attachment with the wiper blade connector.

Referring to FIG. 6, the wiper blade connector 10 is connected to the single tongue wiper arm 60 by engaging the rear wing members (36a, 36b) into the corresponding shoulder members (26a, 26b) and rotating the wiper blade connector 10 upwardly towards the single tongue wiper arms as shown by the directional arrows, such that ramps (29a, 29b) guide the front tongue 62 to engaged receipt within the first tongue receiving opening 22 when the partially rotatable door member 30 is in an open position 32. The partially rotatable door member 30 is then rotated to the closed position 34, thereby locking the wiper blade connector 10 to the single tongue wiper arm 60. The partially rotatable door member 30 includes a flared hood 28 that provides a grasping point for the user to rotate the partially rotatable door member 30 between the open position 32 and closed position 34.

Figure 5:
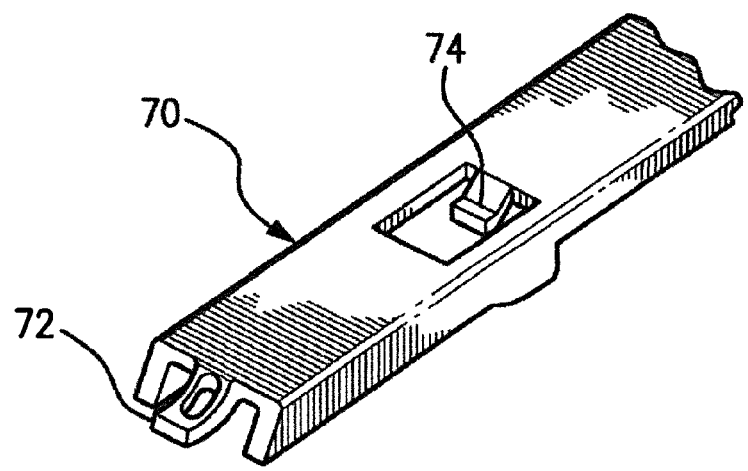
FIG. 5 is a perspective view of a double tongue wiper arm.
Figure 7:
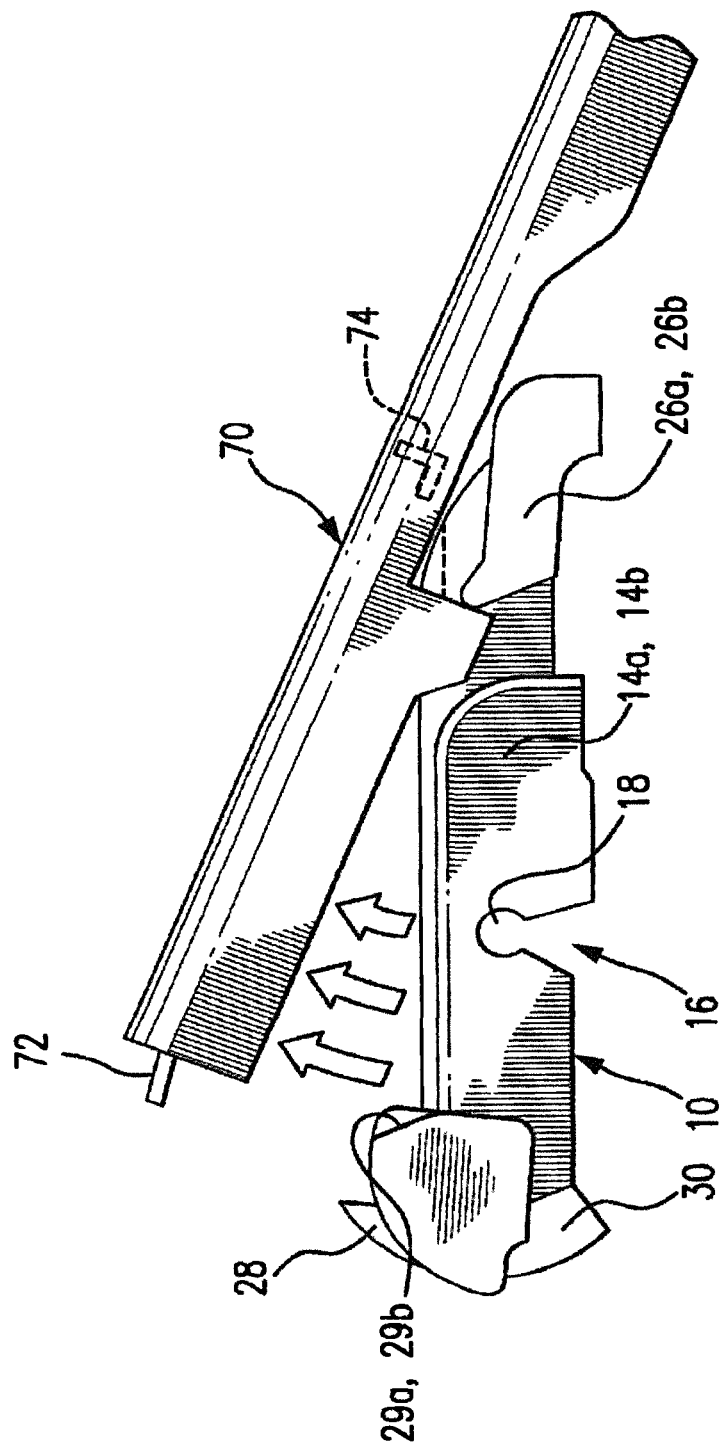
FIG. 7 is a side view of the wiper blade connector of FIG. 1 illustrating the rotational movement of a double tongue wiper arm for attachment with the wiper blade connector.

A double tongue wiper arm 70, illustrated in FIG. 5, may be releasably secured to the wiper blade connector 10 in a process similar to attachment of a wiper blade connector 10 to a single tongue wiper arm 60, as described above. Referring to FIG. 7, the wiper blade connector 10 is connected to the double tongue wiper arm 70 by engaging the rear tongue 74 within the rear tongue receiving opening 24 and rotating the blade connector upwardly, as shown by the directional arrows, such that the front tongue 72 is in line with, and engages, the first tongue receiving opening 22 when the partially rotatable door member 30 is in an open position 32. The ramps (29a, 29b) assist in providing guided receipt of the front tongue 72 within the front tongue receiving opening 22 as the double tongue wiper arm 70 is rotated about the shoulder members (26a, 26b). The partially rotatable door member 30 is then rotated to the closed position 34, thereby locking the wiper blade connector 10 to the double tongue wiper arm 70.

Figure 8:
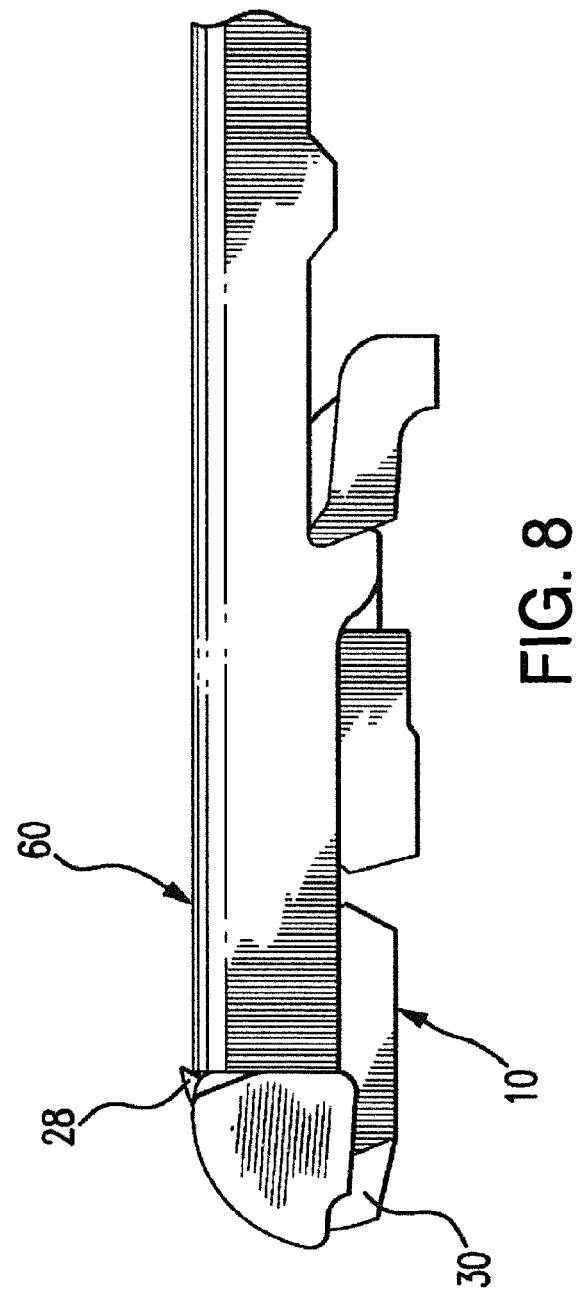
FIG. 8 is a side view of the wiper blade connector of FIG. 1 locked onto a single tongue wiper arm.
Figure 9:
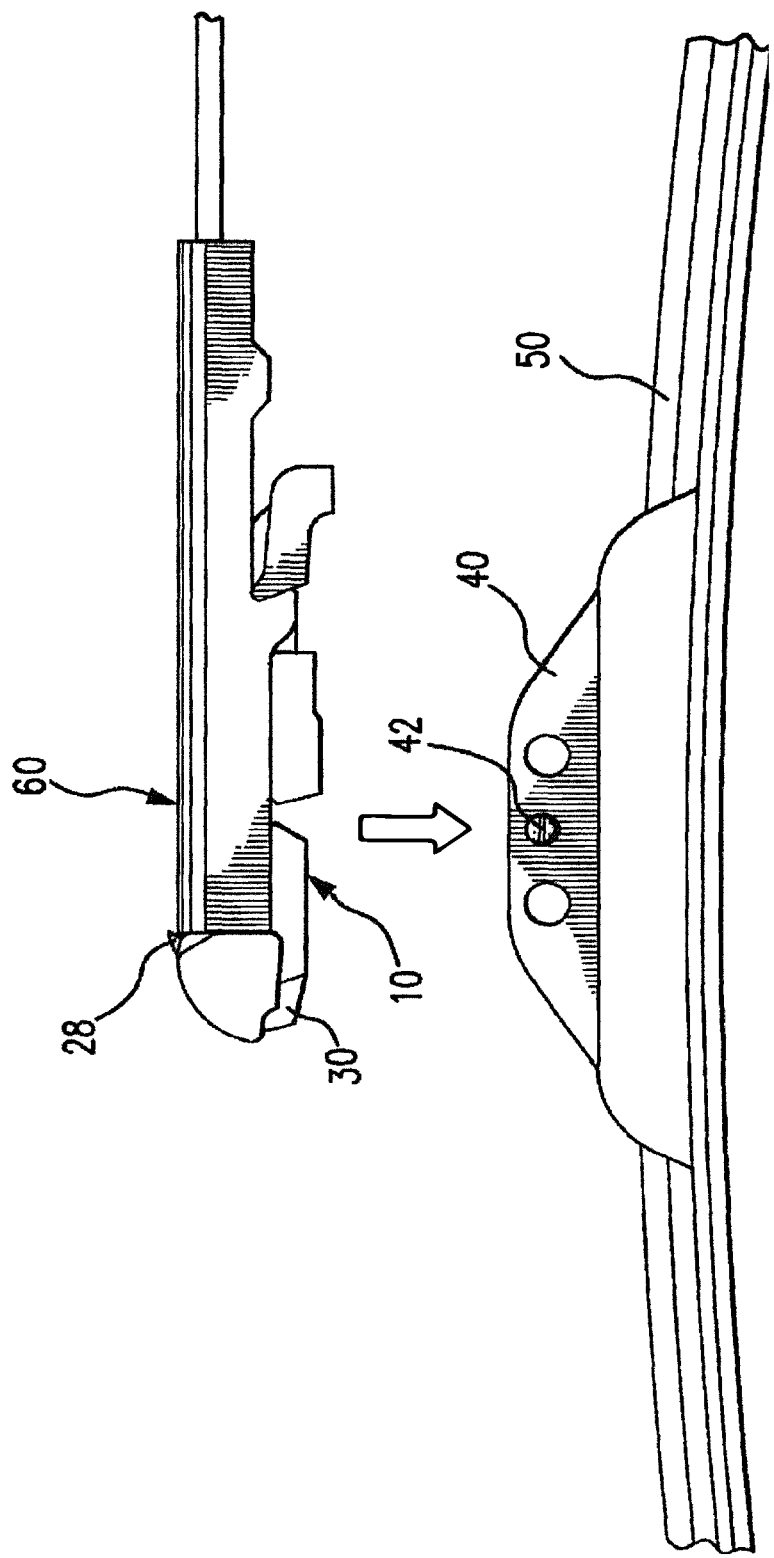
FIG. 9 is a side view of a wiper blade assembly, illustrating the approach of a wiper blade connector and single tongue wiper arm pairing for securing to a wiper blade.
Figure 10:
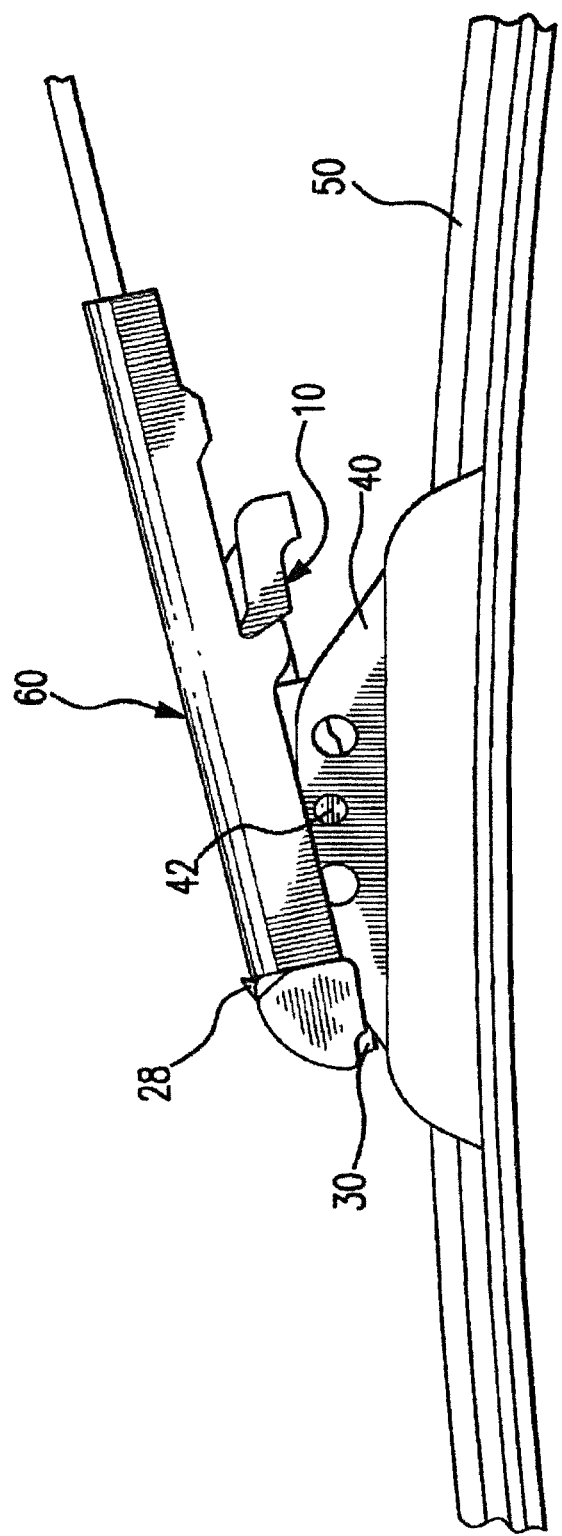
FIG. 10 is a side view of a wiper blade assembly, illustrating the wiper blade connector of FIG. 1 securing a wiper blade to a single tongue wiper arm.
Figure 11:
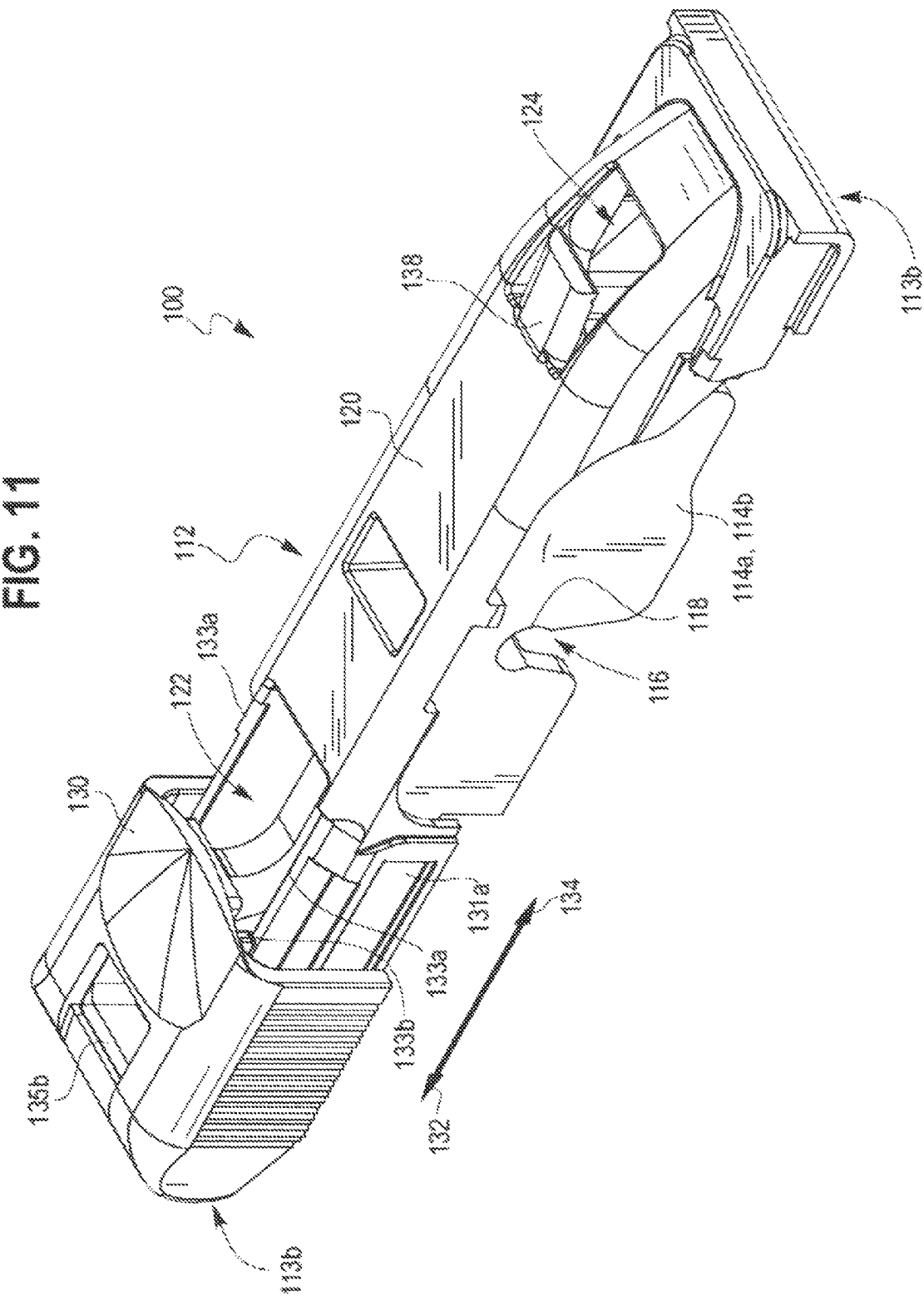
FIG. 11 is a perspective view of an embodiment of a wiper blade connector in accordance with the present disclosure, with the cap in the "open" position.
Figure 12:
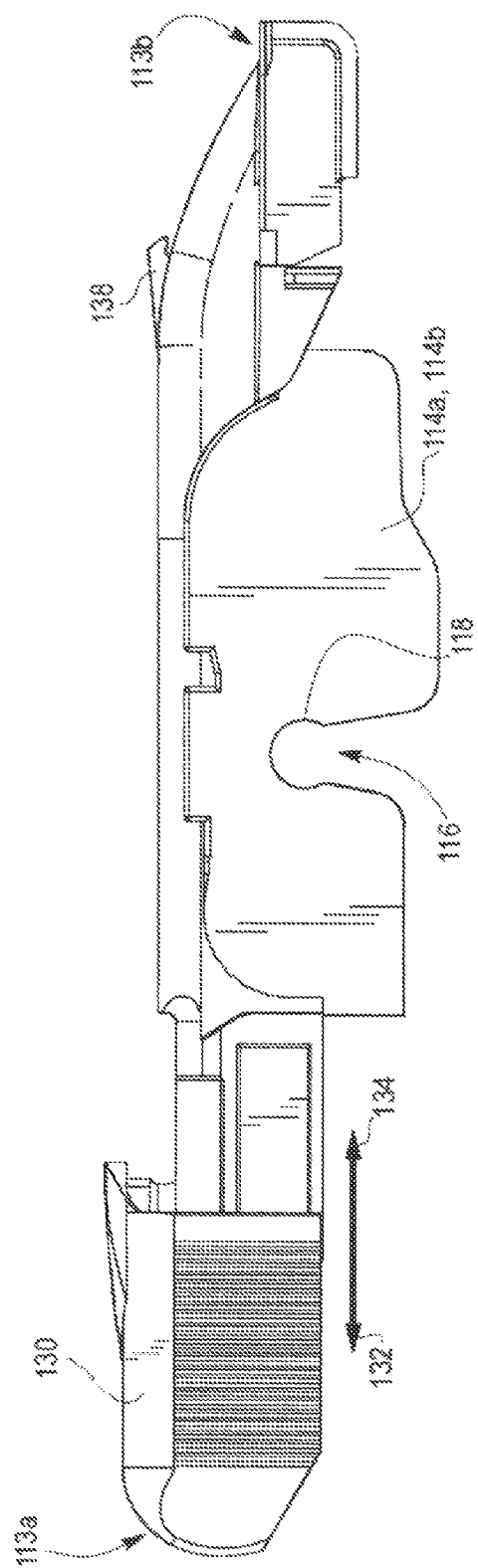
FIG. 12 is a first side view of the wiper blade connector of FIG. 11.
Figure 13:
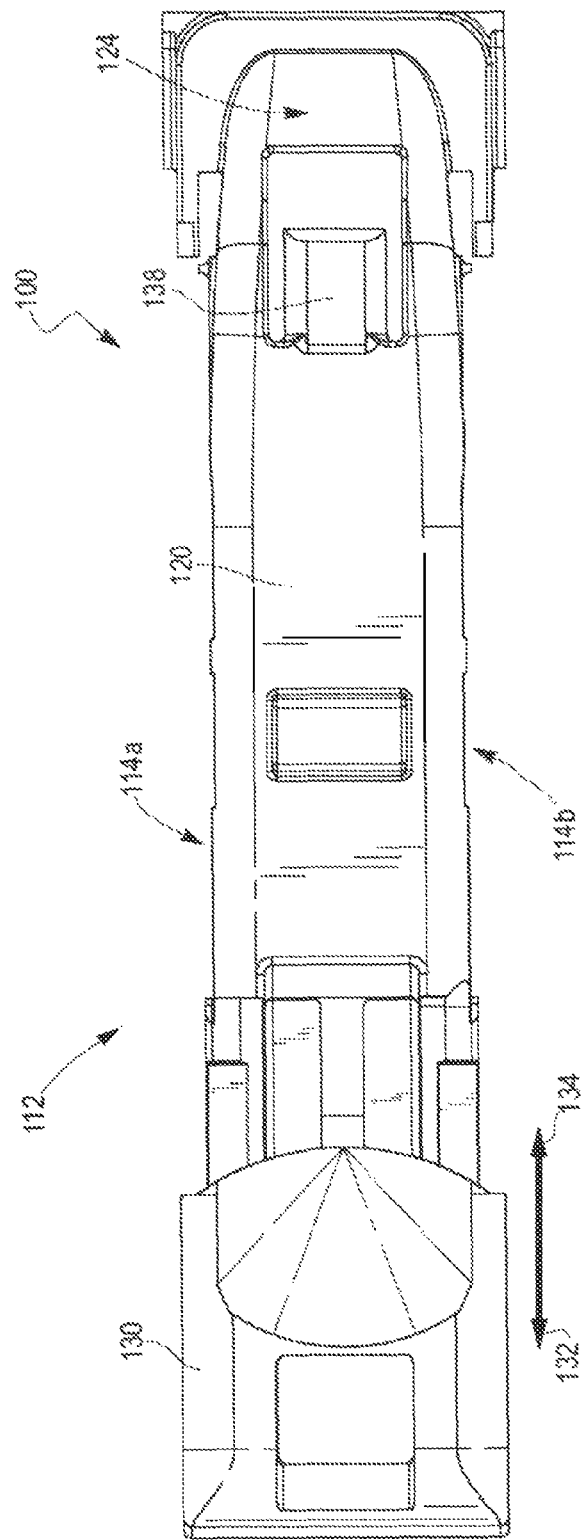
FIG. 13 is a top view of the wiper blade connector of FIG. 11.
Figure 14:
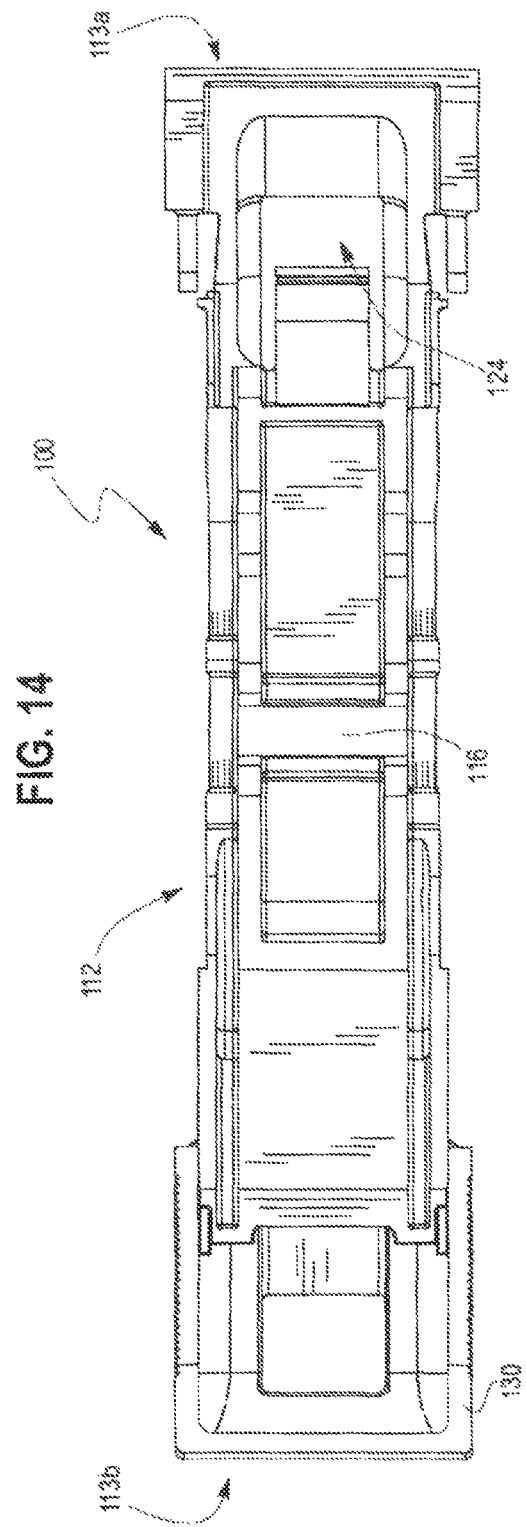
FIG. 14 is a bottom view of the wiper blade connector of FIG. 11.

After securing the wiper blade connector 10 to a single tongue wiper arm 60, as shown in FIG. 8, or double tongue wiper arm 70, the wiper blade 50 may be attached by snapping the rivet 42 located on the mounting base 40 into the arcuate rivet clip 18, thereby completing the wiper blade assembly, as illustrated for instance in FIGS. 9 and 10.

FIGS. 11-18 illustrate an additional embodiment of a wiper blade connector 100, which may include an elongate body member 112 having a front end 113a and a rear end 113b. The elongate body member may be composed of opposite facing side walls 114a, 114b as well as a top surface 120. A rivet passage 116 may be defined may extend between side walls 114a, 114b which may open at the bottom thereby providing access to an arcuate rivet clip 118. The rivet passage 116 and clip 118 may be sized and dimensioned, substantially in accordance with the connector 10 embodiment, so as to engage and secure a rivet 42 in a mounting base 40.

A first tongue opening 122 may be provided proximate or near front end 113b and a second tongue opening 124 may be provided proximate or near rear end 113a. Connector 100 may further include a cap 130 which may be movable or slidable in the longitudinal direction between an open position 132 and a closed position 134, where the first tongue opening 122 is most exposed while the cap 130 is in the open position 132. The cap 130 may also be detachable. FIGS. 11-17 illustrate an embodiment of connector 100 with cap 130 in the open position 132. FIG. 18 illustrates this embodiment of connector 100 with cap 130 in the closed position. In order to accommodate the sliding of cap 130, one or more side channels 131a may be provided on at least one of side walls 114a, 114b. In one embodiment, a pair of side channels 131a are provided, with each side channel on an opposed side wall 114a, 114b. Side channels 131a may be substantially constructed as grooves or slots which are substantially coplanar with the respective side wall 114a, 114b which the side channel 131a is provided on. Each of the one or more side channels may be defined by the portion of side wall 114a between a longitudinally extending upper edge and a longitudinally extending lower edge. This upper edge may project away from its respective side wall 114a, 114b at a distance which is substantially the same as the corresponding lower edge. Body member 112 may further include an upper cap support surface 133a proximate to front end 113b, and adjacent to each one or more side channel 131a. As for the second tongue opening 124, some embodiments include a rear tab 138 projecting the second tongue opening 124. The second tongue opening 124 may be positioned proximate to the rear end 113a of body member 112.

Figure 15:
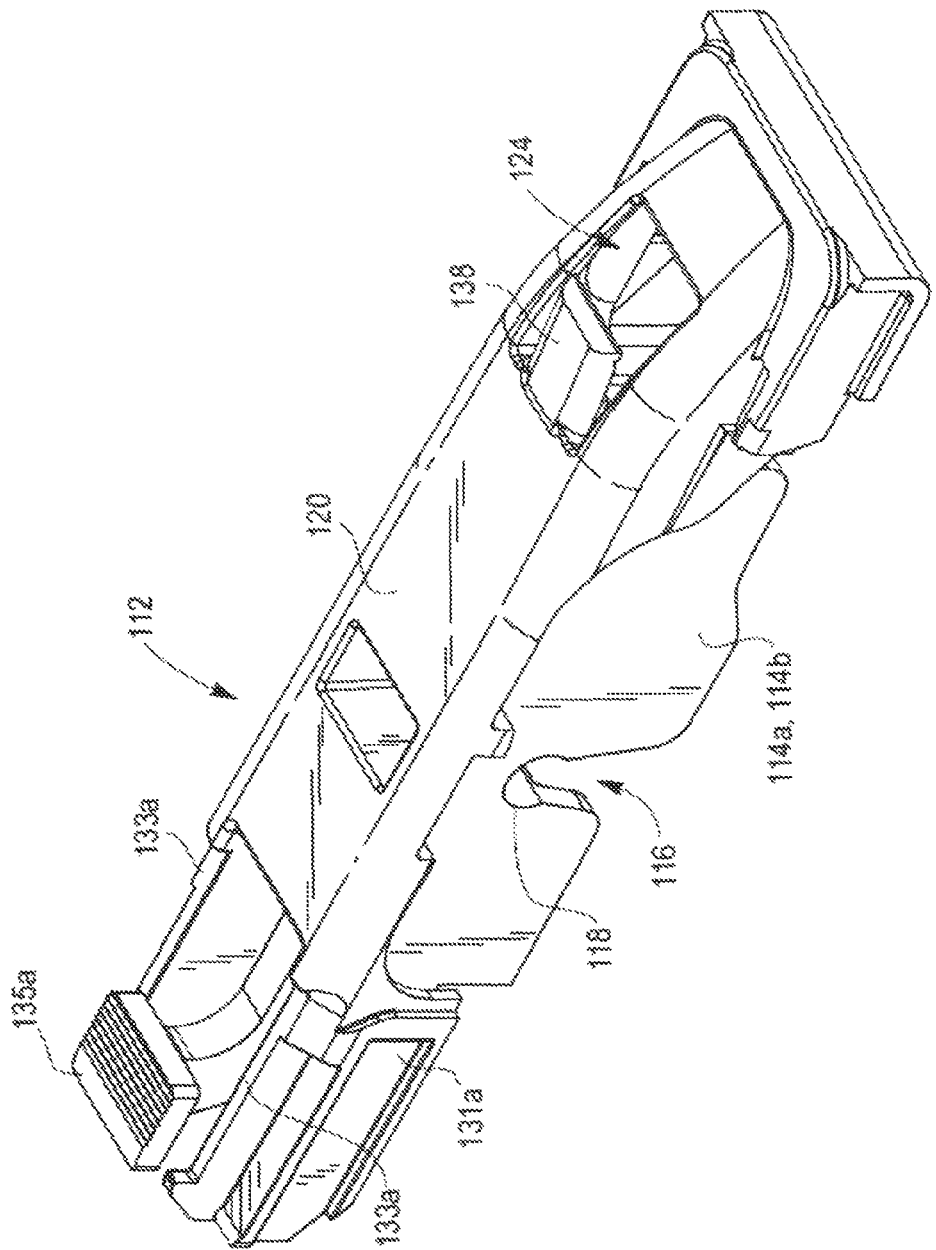
FIG. 15 is a perspective view of the wiper blade connector of FIG. 11 with the cap removed.

FIG. 15 illustrates an embodiment of connector 100 with cap 130 removed, thereby showing the top portion of front locking tab 135a is illustrated. Front locking tab 135a includes the top portion, which is illustrated in FIG. 15 as a substantially rectangular component, as well as an arm portion which extends towards and is attached to elongate body member 112. Other suitable shapes and sizes for the front locking tab 135a may also be used. The arm portion may be sufficiently recessed within first tongue opening 122 so as not to interfere with the insertion of a front tongue into front tongue opening 122, as described herein. The top portion of locking tab 135a may be conformingly shaped and dimensioned with a locking tab cavity 135b provided on an upper surface of cap 130. When cap 130 is in the closed position 134, the upper portion of front locking tab 135a may conformingly fit within cavity 135b thereby securing cap 130 in the closed position 134.

Figure 16:
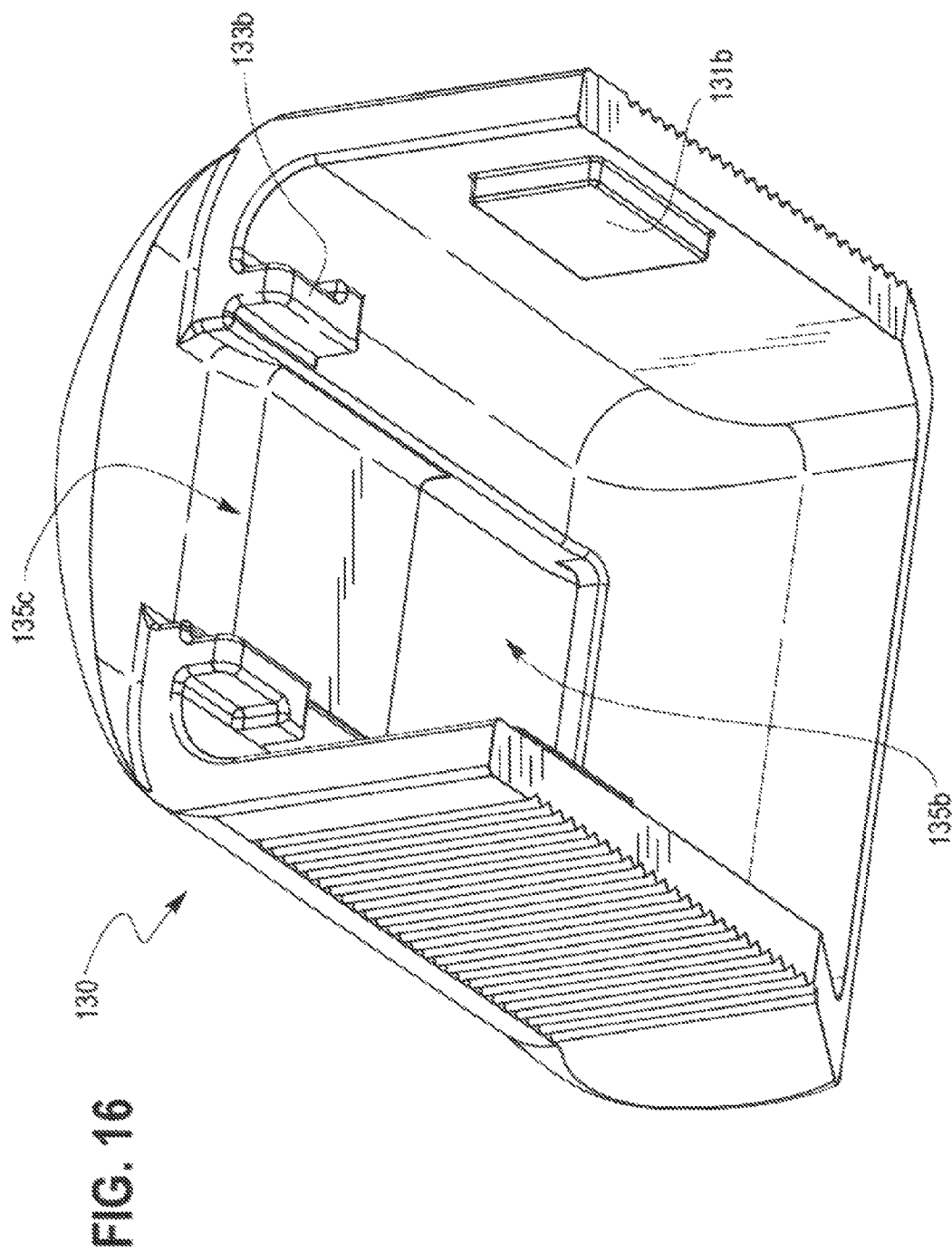
FIG. 16 is a perspective view of the cap of the wiper blade connector of FIG. 11.

A bottom perspective of the removed cap 130 is illustrated in FIG. 16. Side indents or protrusions 131b are illustrated on the interior of side walls for cap 130. Each side indent 131b may be conformingly shaped with side cavity 131a such that side indent 131b may slide alongside cavity 131a as cap 130 is slid between the open and closed positions. Upper indents or protrusions 133b may be further provided on the underside of cap 130. Each upper indent 133b may contact the upper cap support surface 133a. Each upper indent 133b project downwards from the upper portion of cap 130, and in this regard the distance which upper indent 133b projects downwards may be the clearance distance between the upper portion of cap 130 and the upper cap contacting surface 133a of the body member 112. Additionally, on the interior underside of the upper portion of cap 130 may be a locking tab cavity 135b which may be sized and conformingly dimensioned with the upper portion of front locking tab 135a. In this regard, the upper portion of front locking tab 135a may slide along the locking tab channel 135c as the cap 130 is moved from the open position 132 to the closed position 134, and the upper portion of front locking tab 135a may conformingly fit within locking tab cavity 135b in order to secure cap 130 in the closed position. A portion of the interior upper surface of cap 130 may be resiliently project into the locking tab channel 135c in order to secure the locking tab 135a within the cavity 135b when the cap is in the closed position. The interior upper surface of the cap may also be chamfered to facilitate the insertion and securing of the locking tab 135a. A longitudinal force, such as that applied by a user sliding cap 130 between the open and closed positions 132, 134, may be increased so as to bias the resilient the portion of cap 130 within locking tab channel 135c thereby facilitating the passing of the upper portion of tab 135a into and out of cavity 135b.

Figure 17:
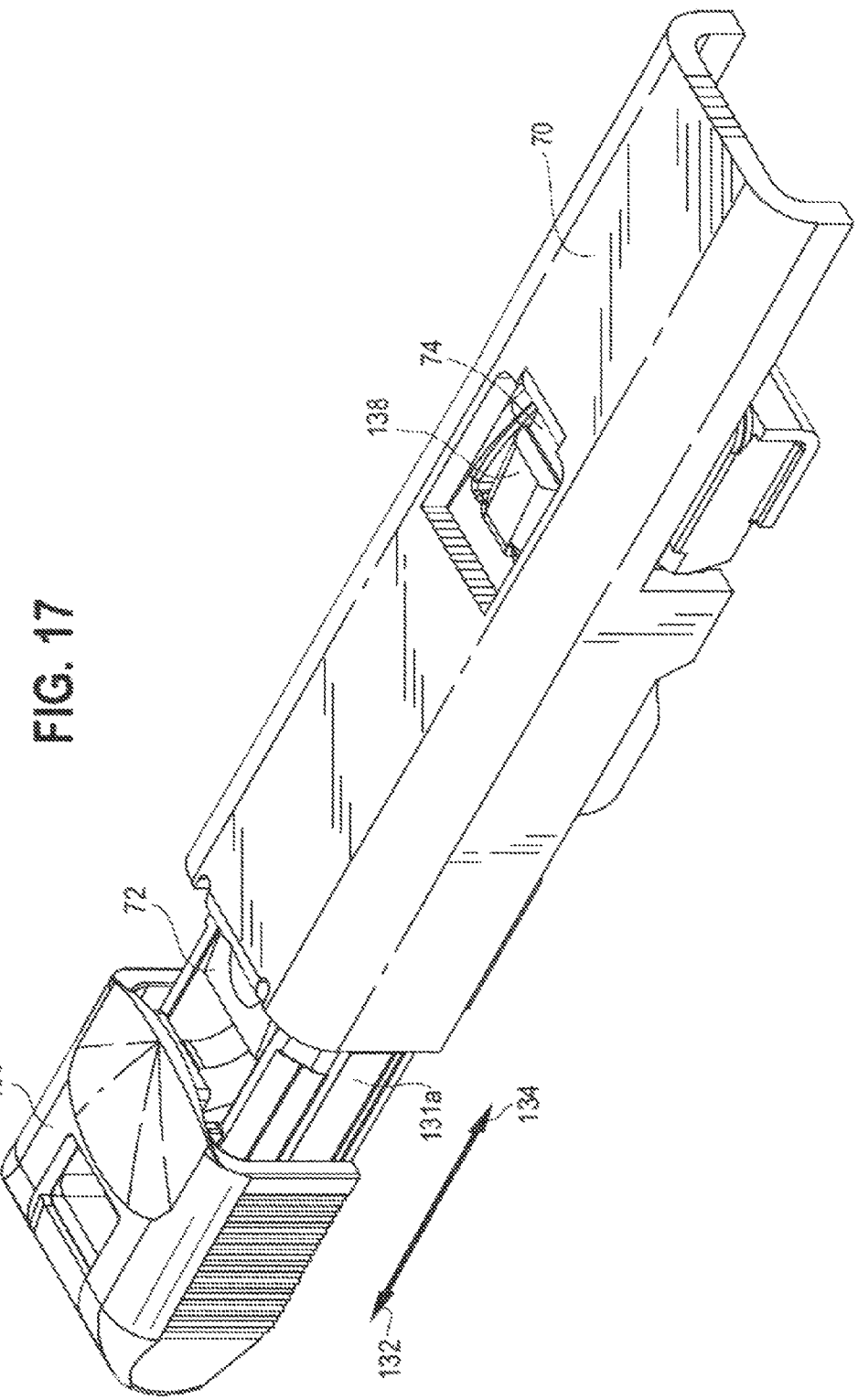
FIG. 17 is a perspective view of the wiper blade connector of FIG. 11, with and a wiper arm.
Figure 18:
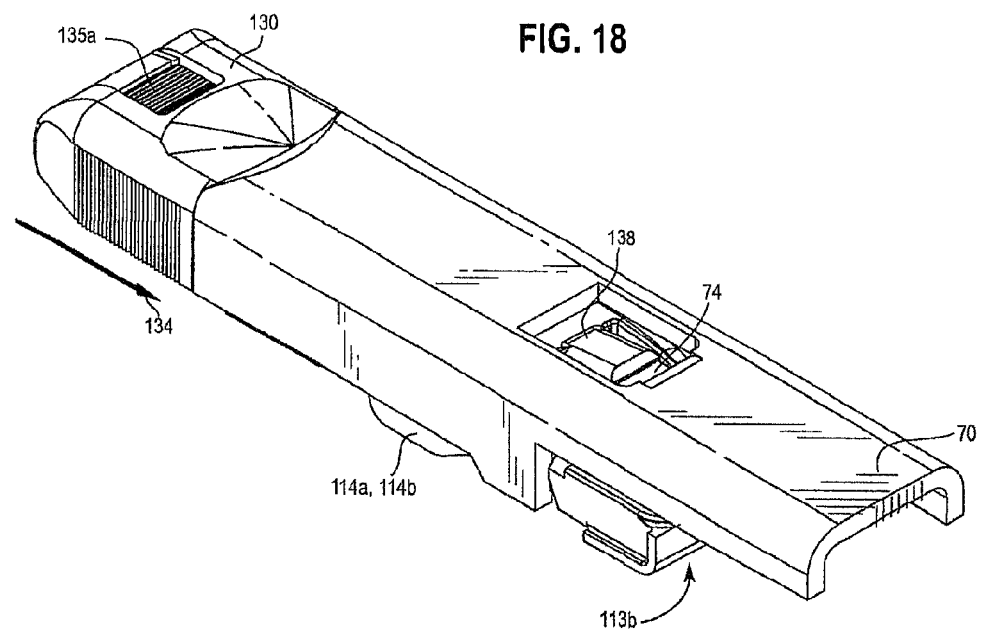
FIG. 18 is a perspective view of the wiper blade of FIG. 11 with the cap in the "closed" position.

FIG. 17 illustrates the securing of wiper arm 60 to connector 100. If cap 130 is in the open position 132, a front tongue 62, 72 of a wiper arm 60, 70 may be received within first tongue opening 122, and the front tongue 62, 72 may be secured within first tongue opening 122 as cap 130 is slid towards closed position 134. The projected length of upper indent 133b thereby creates a clearance distance between the cap 130 and cap support surface 133a, which may thereby permit cap 130 to slide over the distal portion of front tongue 72 as it is locked into front tongue opening 122. Side channels 131a may thereby operate to permit a longitudinal sliding of cap 130 between the open and closed position 132, 134, and front tab 135a may operate to secure cap 130 in the closed position 134. Further illustrated is second tongue 74 which can be fitted into second tongue receiving opening 124 such that at least the distal portion of second tongue 74 is positioned below rear tab 138, thereby securing second tongue 74 in second tongue receiving opening 124. It should be appreciated that Connector 100 is usable with both a single and double tongue wiper arms.

A wiper blade may be provided with an embodiment of connector 10, 100 as described herein. The wiper blade can be of any type suitable for use with the present invention. For example, the wiper blade may be a traditional wiper blade having a plurality of frames which carry a wiper strip, and has a mounting base embedded in, or attached to, the plurality of frames. The wiper blade may also be a bracketless or "beam"-type wiper blade, having one or more spring-elastic beams, a wiper strip, and a mounting base. The wiper blade may also be a hybrid wiper blade, having a combination of a beam and one or more frames, a wiper strip, and a mounting base. Regardless of the type of wiper blade, it may have a mounting base which connects the wiper blade to the wiper arm (60, 70) through the use of a connector 10, 100. As discussed above, in certain embodiments, the mounting base 40 has a rivet extending between two spaced apart side walls, which can pass through the rivet passage 16, 116 in the connector 10, 100, until it is seated in the arcuate rivet clip 18, 118. In other embodiments, the mounting base 40 can have one or more pins, holes, recesses, channels, or other structures corresponding to the connector's 10, 100 means for connecting to the mounting base 40.

In certain embodiments, the connector 10, 100 will preferably be connected to the mounting base 40 of the wiper blade 50 prior to connecting to the wiper arm (60, 70). In other embodiments, the connector 10, 100 will preferably be connected to the wiper arm (60, 70) prior to being connected to the mounting base 40 of the wiper blade 50. In other embodiments, the connector 10, 100 may either be connected first to the mount base 40 of the wiper blade 50 or to the wiper arm (60, 70).

Figure 19:
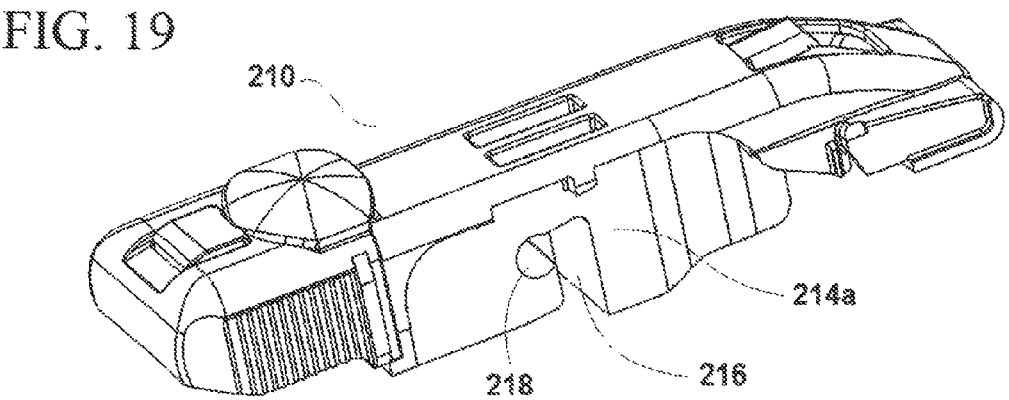
FIG. 19 is a perspective view of an embodiment of a wiper blade connector of the present disclosure.
Figure 20:
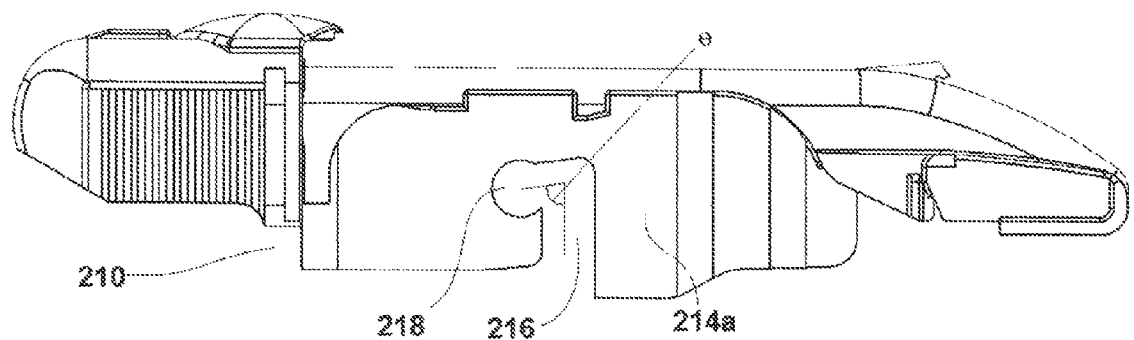
FIG. 20 is a side view of a wiper blade connector embodiment of the wiper blade connector of FIG. 19.
Figure 21:
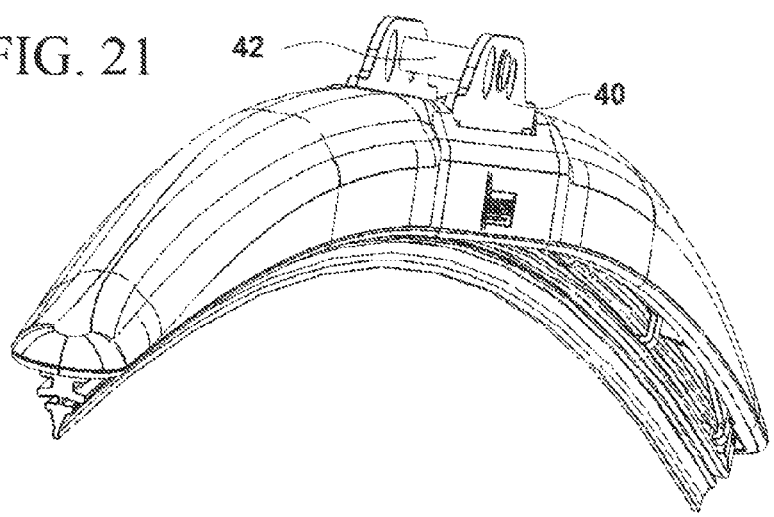
FIG. 21 illustrates a wiper blade having a mounting base with a rivet.

FIGS. 19 and 20 illustrate an additional embodiment of the connector securing structure for connecting a connector 210 with a mounting base 40. Connector 10 may include a rivet passage 216 and an arcuate rivet clip 218, wherein the arcuate rivet clip extends substantially perpendicular to the rivet passage such that the axis of the arcuate rivet clip is offset from the line extending along the middle of the rivet passage. The arcuate rivet clip may extend between the first and second side walls (214a, 214b) and may be structured and disposed for releasably securing the wiper blade to the connector, and the arcuate rivet clip sized to permit the releasably secured wiper blade to pivot during operation of the wiper blade. The rivet passage may extend between the first and second side walls, and may be structured and disposed to permit access to the arcuate rivet clip. This particular embodiment allows for an increased retention force (providing more security) for the connector to remain attached to the wiper blade as it has a "hook" like shape that will hold the connector on the rivet when the blade is tilted to the maximum angle in either the wiper tip down position or wiper tail down position. In some embodiments it may be advantageous for the angle θ formed between middle line of the rivet passage 216 and the line from the top of same to the axis of the arcuate rivet clip is between 75 and 90 degrees, as shown in FIG. 20. Persons of skill in the art will recognize that the offset rivet clip discussed with the disclosed concepts can be practiced with any type of connector having one or more walls. In the embodiments shown in FIGS. 19 and 20, the offset arcuate rivet clip 218 extends between the first and second side walls. However such offset rivet clips 216 may be implemented on a single wall, on more than two walls, or on some, but not all walls. For example some connectors may have a pair of internal side walls and a pair of external side walls. The offset arcuate rivet clip 218 may be included on some or all of the side walls in such a connector. Similarly, persons of skill in the art will recognize that although the description used in conjunction with FIGS. 19-20 discusses connection to a rivet 42 disposed within the side walls of mounting base 40, as shown in FIG. 21, the disclosed concepts may be practiced with any suitable connection system, including replacing rivet 42 with internal projections, or having a mounting base that has external projections.

While the present invention has been shown and described in accordance with a preferred and practical embodiment thereof, it is recognized that departures from the instant disclosure are fully contemplated within the spirit and scope of the invention.

What is claimed is:

1. A connector for connecting a wiper blade to a wiper arm, the connector comprising:
   an elongate body member having a front end, a rear end, a first side wall, a second wall, and a top surface extending between the first and second side walls;
   a connector securing structure, wherein the connector securing structure comprises a rivet passage and an arcuate rivet clip, the arcuate rivet clip extending from the rivet passage at an angle between 75 and 90 degrees, the rivet passage and the arcuate rivet clip together having a hook like shape;
   a first side channel longitudinally extending along a portion of an outer surface of the first side wall proximate the first end of the elongate body member;
   a first tongue receiving opening located towards the front end of the elongate body member, the first tongue opening structured to receive a corresponding front tongue on the wiper arm; and
   a U-shaped cap having an upper wall and first and second side walls, and including a first side protrusion provided on an interior surface of the first side wall of the cap, the first side protrusion correspondingly dimensioned and positioned to slide along the first side channel as the cap is slid between an open position and a closed position, the cap operable to secure the received corresponding front tongue on the wiper arm, wherein the first side channel is oriented in a direction corresponding with the longitudinal direction of the elongate body member, the cap thereby slidable substantially parallel to the top surface.

2. The connector of claim 1, further comprising
   a second side channel longitudinally extending along a portion of an outer surface of the second side wall proximate the first end of the elongate body member; and
   an additional side protrusion provided on an opposed interior side surface of the cap, the additional side protrusion correspondingly dimensioned and positioned to slide along the second side channel as the cap is slid between the open and closed positions.

3. The connector of claim 1 further comprising:
   a front locking tab provided within the first tongue opening, the front locking tab including a top portion and an arm portion connecting the top portion with the elongate body member; and
   a locking tab channel provided on an under side surface of the cap, the locking tab channel conformingly dimensioned to permit the top portion of the front locking tab to slide along the locking tab channel as the cap is slid between the open and closed position.

4. The connector of claim 3, further comprising a locking tab cavity provided on the cap adjacent to locking tab channel, the cavity conformingly dimensioned with the top portion of the locking tab and positioned to receive the top portion of the locking tab when the cap is in the closed position.

5. The connector of claim 4, wherein a resilient portion of the cap projects into the locking tab channel in order to increase the longitudinal force required to slide the top portion of the locking tab into and out of the cavity.

6. The connector of claim 1 further comprising an upper protrusion projecting from an underside surface of the cap, the upper tab contacting the upper surface of the elongate body member.

7. The connector of claim 6, wherein the distance which the upper protrusion projects from the underside surface is a clearance distance between cap and the upper surface of the elongate body member, the clearance distance sufficient to permit the cap to slide over a distal portion of the received front tongue as the cap is slid into the closed position.

8. The connector of claim 1, wherein the arcuate rivet clip extends between the first and second side walls and is structured and disposed for releasably securing the wiper blade to the connector, and the arcuate rivet clip sized to permit the releasably secured wiper blade to pivot during operation of the wiper blade; and the rivet passage extending between the first and second side walls, the rivet passage structured and disposed to permit access to the arcuate rivet clip.

9. A wiper blade assembly comprising:
   a wiper blade comprising a wiper strip and a mounting base;
   a connector for connecting a wiper blade to a wiper arm, the connector comprising:
   a body member having a first side wall, a second wall, and a top surface extending between the first and second side walls;
      a connector securing structure, wherein the connector securing structure comprises a rivet passage and an arcuate rivet clip, the arcuate rivet clip extending from the rivet passage at an angle between 75 and 90 degrees, the rivet passage and the arcuate rivet clip together having a hook like shape
   wherein the body member further comprises a front end, and a rear end,
      a first side channel longitudinally extending along a portion of an outer surface of the first side wall proximate the front end of the body member;
      a first tongue receiving opening located towards the front end of the body member, the first tongue opening structured to receive a corresponding front tongue on the wiper arm; and
      a U-shaped cap having an upper wall and first and second side walls, and including a first side protrusion provided on an interior surface of the first side wall of the cap, the first side protrusion correspondingly dimensioned and positioned to slide along the first side channel as the cap is slid between an open position and a closed position, the cap operable to secure the received corresponding front tongue on the wiper arm, wherein the first side channel is oriented in a direction corresponding with the longitudinal direction of the body member, the cap thereby slidable substantially parallel to the top surface.

\* \* \* \* \*